Patented Aug. 24, 1943

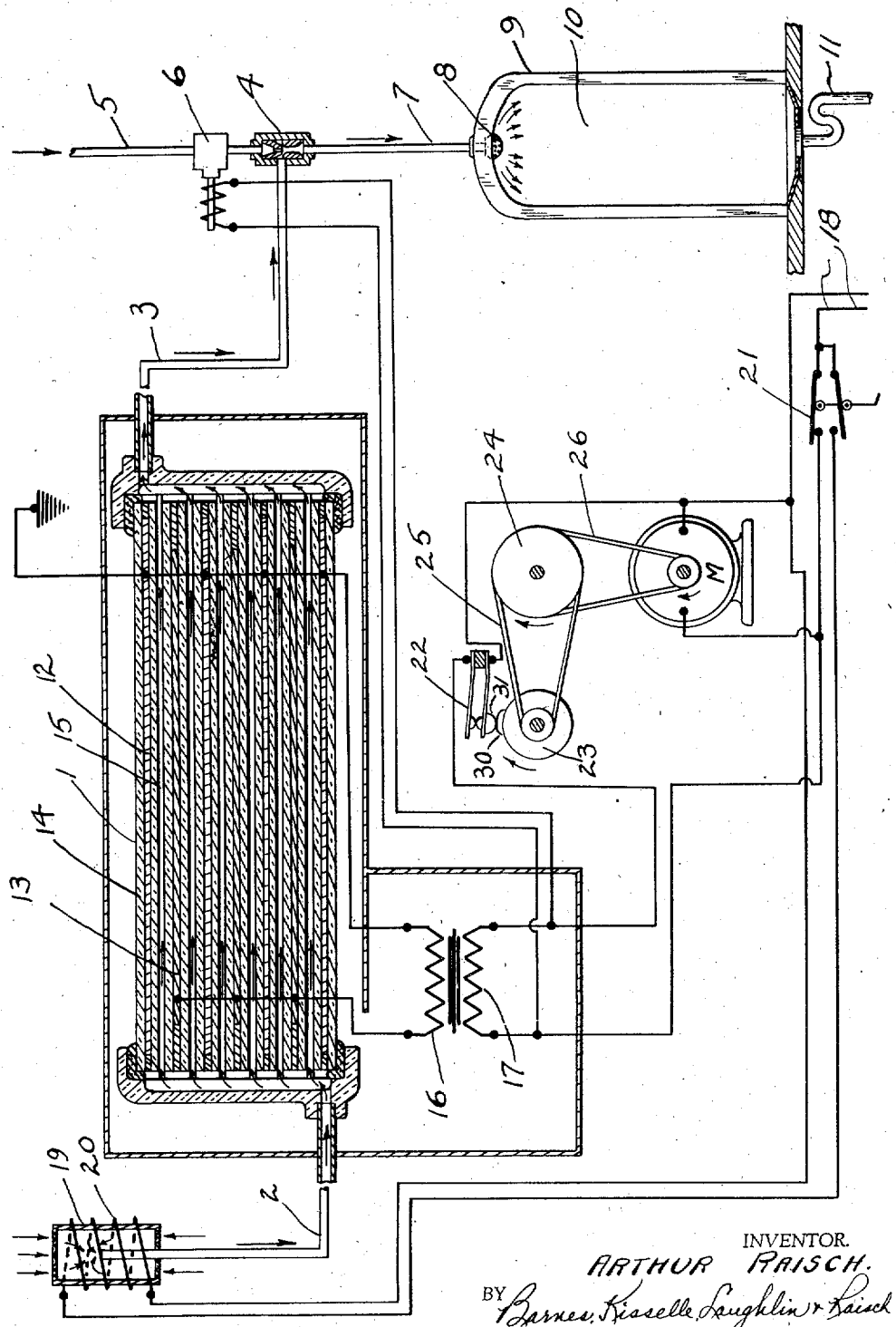

2,327,457

UNITED STATES PATENT OFFICE 2,327,457

APPARATUS FOR TREATING URINE

Arthur Raisch, Royal Oak, Mich., assignor to Sanozone Corporation, Detroit, Mich., a corporation of Michigan Application December 19, 1940, Serial No. 370,861

4 Claims. (Cl. 4—99)

This invention relates to an apparatus for treating urine. More particularly the invention concerns an apparatus and method for flushing a urinal.

When urine is discharged into a urinal, a certain amount adheres to the surfaces of the fixture and the piping below the receptacle. Some of the urine is deposited around the base by splashing and carelessness. As this material accumulates at these points, chemical and microbiological decomposition occurs. The longer the interval between cleaning and disinfection, the greater the amount of decomposition and the greater the resulting nuisance due to the odor generated by the decomposition.

Urine is a complex mixture of organic wastes from the animal body. It consists of nitrogenous substances, chiefly urea. This substance when attacked by micro-organisms yields large quantities of ammonia, which is decidedly offensive. The introduction of various ill-smelling chemicals is largely subterfuge, as these compounds merely camouflage the odor. It is purely a case of masking a disagreeable odor by another which is less offensive. The source of the trouble is still present.

In nature these compounds are eliminated by a slow oxidation whereby these disagreeable substances are slowly mineralized and rendered inoffensive. The instant invention is an improvement upon nature's methods whereby the oxidation is speeded by the direct application of nascent oxygen which is a very active substance. This oxygen made from ozone breaks up the urea molecule and changes the objectionable compound into odorless carbon dioxide, nitrogen and water, all simple compounds which are perfectly stable and harmless. Not only have the objectionable materials been definitely removed by rapid oxidation but the bacteria that normally would grow on the urinal fixture are destroyed. Thus this process purifies the urine wastes as well as acting as a sanitizing agent.

In addition, a slight excess of ozone gas can be discharged into the air of the toilet room, acting as a deodorizer and rendering the air pleasant to breathe. Here again the action of the ozone is positive. The ozone does not mask the disagreeable odors but actually destroys them. The chemical reaction between ozone and urea is as follows:

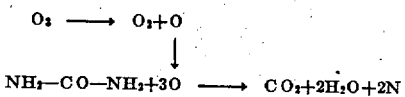

The drawing shows a schematic layout of the ozone generating device and a device for dissolving the ozone in water and for flushing the urinal with a water solution of ozone.

Referring more particularly to the drawing there is shown an ozone generating cell generally designated 1 provided with an air inlet line 2 and an ozone outlet line 3 which communicates with an inductor 4. The inductor 4 is connected in the water line 5 which is controlled by the solenoid valve 6. The inductor is connected by pipe line 7 with the spray nozzle 8 positioned within the urinal 9 so that the water solution of ozone will be sprayed against the inside face 10 of the urinal 9. Urinal 9 is provided with the usual outlet pipe line 11.

The ozone generating cell 1, herein shown by way of description rather than limitation, is of the type described and claimed in copending application of Clifford H. Kain and Richard J. Schaefer, Serial No. 350,684, filed August 3, 1940. It is, of course, understood that the ozone can be generated by known apparatuses and methods. The ozone cell comprises a plurality of low voltage electrodes 12 and a plurality of high voltage electrodes 13. Each of the electrodes 12 and 13 is sealed within a suitable dielectric such as the plates of glass 14. The air spaces 15 are provided between the electrodes through which the air passes and some of the oxygen contained therein is transformed into ozone by the high tension silent electric glow which takes place in the air spaces between the high and low voltage electrodes.

The high voltage electrodes are connected with the secondary winding 16 of the transformer. The primary winding of the transformer is designated 17 and is in circuit with the ordinary 110 volt circuit designated 18. Preparatory to passing into line 2 which leads to the ozone generating cell 1, the air is dried by passing through a drier 19 consisting of a housing filled with "silica gel" as described in copending application of Clifford H. Kain and Richard J. Schaefer, Serial No. 350,684, filed August 3, 1940. The "silica gel" is reactivated by the application of heat generated by electrical resistance element 20 which is placed in circuit with the 110 volt circuit 18 by means of the double throw switch 21, that is, when the primary circuit 17 of the ozone generating cell is thrown off, the switch 21 places the heating element 20 in circuit with circuit 18 thereby heating the "silica gel" to reactivate the same. A flow of air through the drier and into line 2 is indicated by the arrows.

It is only necessary to have the urinal flusher operate intermittently. Any suitable timing mechanism can be used. By way of example, to this end there is a cam operated switch 22 positioned in the primary circuit 18 for intermittently breaking and making the circuit. The intermittent opening and closing of switch 22 is effected by a rotary cam member 23 which is driven preferably by a low powered shaded pole motor M through belts 25 and 26 and pulley 24. The motor M is connected into the primary circuit 18. The rotation of cam 23 is clockwise as indicated by the arrow. The solenoid water valve 6 is also connected into the primary circuit 18.

In operation when switch 21 closes the circuit to the primary of the transformer (provided switch 22 is closed) at the same time it energizes the solenoid of the solenoid operated water valve 6 so that the ozone generating cell 1 is energized at the same time that water is permitted to flow through the valve 6, inductor 4, line 7, and nozzle 8 to the urinal. At the same time the circuit, including the heating element 20, is broken. The period of time between flushings is dependent upon the rotative speed of cam 23 whereas the actual flushing time is dependent upon the length of the cam contact 30.

As shown in the drawing, the switch 22 is closed and the circuit through the primary 17 and through solenoid valve 6 is closed. Therefore the ozone generating cell is operative to generate ozone. As the water flows through the inductor 4 a suction is set up in the ozone suction line 3 leading from the air channels 15 through the ozone generating cell, which in turn are supplied with dry air from the drier 19 through the air suction line 2. As the air passes through the generating cell and is acted upon by the corona produced therein, the oxygen of the air is changed to $O_3$ and mixed with the water by means of the inductor 4 and this mixture or solution of ozonated water is used as a flushing medium in the urinal upon being sprayed through nozzle 8.

The ozone in the water, when it comes in contact with the urine, or any organic deposits or material in the urinal, oxidizes these elements and neutralizes the odors present due to such deposits and conditions. It destroys the fungus growth and other deposits in the trap of the urinal thereby creating a wholesome and practically odorless condition in and surrounding the urinals.

The flushing of the urinal 9 continues as long as switch member 31 rides upon cam contact 30. As soon as cam contact rotates beyond switch element 31, switch 22 opens thereby breaking the circuit to the primary 17 and deenergizing solenoid valve 6 which immediately closes thereby shutting off water line 5. When the primary circuit 17 is broken the ozone cell is also deenergized. As soon as cam contact 30 makes a complete revolution whereupon it again contacts with switch element 31 to close the switch 32, the urinal is again flushed and the cycle of operation repeated.

The electric timing mechanism in the unit turns on both the flushing water and the generator at the same time, for example, every five or ten minutes. Water is discharged for flushing for any suitable period, for example, thirty seconds, regulated by the timing mechanism.

After a predetermined length of operation the "silica gel" in the drier 19 should be reactivated or line 2 should be connected with a dehydrated drier. Preferably the "silica gel" is reactivated whenever the urinal flusher is turned off. To this end when the switch 21 is operated to break the primary, the circuit to the heating element 20 is completed and the "silica gel" reactivated by heating to the proper temperature.

I claim:

1. In combination with a urinal, a source of water under pressure, a line connecting the source of water under pressure with the urinal, an inductor connected in the water line, an electrically operated cell for generating ozone, a conduit connecting the ozone generating cell with the inductor whereby the water in flowing through the inductor draws the ozone from the cell into the inductor for mixing the same with the water preparatory to flushing the urinal.

2. In combination with a urinal, a source of water under pressure, a line connecting the source of water under pressure with the urinal, an inductor connected in the water line, an electrically operated cell for generating ozone, a conduit connecting the ozone generating cell with the inductor whereby the water in flowing through the inductor draws the ozone from the cell into the inductor for mixing the same with the water preparatory to flushing the urinal, and timing mechanism in circuit with the ozone generating cell for intermittently making the ozone generating circuit.

3. In combination with a urinal, a source of water under pressure, a line connecting the source of water under pressure with the urinal, a solenoid operated valve in said water line, an inductor connected in the water line, an electrically operated cell for generating ozone, a transformer having a secondary in circuit with the ozone generating cell and a primary in circuit with the solenoid operated valve whereby when the circuit is completed the ozone cell is set in operation and the solenoid valve is energized to open the same, a conduit connecting the ozone generating cell with the inductor whereby the water in flowing through the inductor draws the ozone from the cell into the inductor for mixing the same with the water preparatory to flushing the urinal.

4. In combination with a urinal, a source of water under pressure, a line connecting the source of water under pressure with the urinal, an inductor connected in the water line, an electrically operated cell for generating ozone, a conduit connecting the ozone generating cell with the inductor whereby the water in flowing through the inductor draws the ozone from the cell into the inductor for mixing the same with the water preparatory to flushing the urinal, and timing mechanism in circuit with the ozone generating cell for intermittently making the ozone generating circuit, and means controlled by said timing mechanism for controlling the flow of water through said water line whereby water flows through said water line whenever the ozone generating cell is generating ozone.

ARTHUR RAISCH.